United States Patent [19]

Ramanathan

[11] Patent Number: 4,562,247

[45] Date of Patent: Dec. 31, 1985

[54] DISAZO COMPOUNDS CONTAINING A 6-ACETOACETAMIDE-1-NAPHTHOL-3-SULFONIC DERIVATIVE AS COUPLING COMPONENT

[75] Inventor: Visvanathan Ramanathan, Basel, Switzerland

[73] Assignee: Ciba Geigy Corporation, Ardsley, N.Y.

[21] Appl. No.: 614,909

[22] Filed: May 29, 1984

[30] Foreign Application Priority Data

Jun. 7, 1983 [CH] Switzerland .................. 3110/83

[51] Int. Cl.$^4$ .................. C09B 31/10; C09B 33/28; C09B 43/00; C09B 44/02
[52] U.S. Cl. .................. 534/605; 162/162; 534/608; 534/614; 534/606; 534/740; 534/741; 534/742; 534/743; 534/744; 534/734
[58] Field of Search .................. 534/740, 741, 744, 605, 534/608, 614, 606; 260/153, 176

[56] References Cited

U.S. PATENT DOCUMENTS 3,420,812 1/1969 Langbein et al. .................. 534/744

FOREIGN PATENT DOCUMENTS 0054616 6/1982 European Pat. Off. .......... 260/153
2081734 2/1982 United Kingdom .............. 260/153
2082615 3/1982 United Kingdom .............. 260/153

Primary Examiner—Floyd D. Higel
Attorney, Agent, or Firm—Edward McC. Roberts; Kevin T. Mansfield; Irving M. Fishman

[57] ABSTRACT

There are described azo compounds of the formula

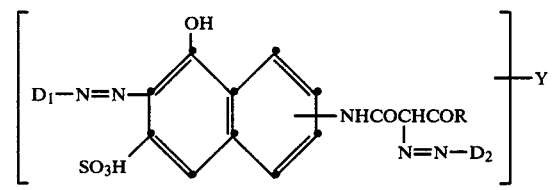

wherein $D_1$ and $D_2$ are each the radical of a diazo component, R is $C_1$–$C_4$-alkyl or $C_1$–$C_4$alkyl substituted by $C_1$–$C_4$-alkoxy or halogen or is phenyl or phenyl substituted by $C_1$–$C_4$-alkyl, halogen or $C_1$–$C_4$ alkoxy, and Y is a basic or cationic group. These azo compounds can be used as dyes for dyeing and printing natural and synthetic, cationically dyeing substrates, particularly textile materials and paper.

6 Claims, No Drawings

DISAZO COMPOUNDS CONTAINING A 6-ACETOACETAMIDE-1-NAPHTHOL-3-SULFONIC DERIVATIVE AS COUPLING COMPONENT

The invention relates to novel basic or cationic azo compounds, to processes for producing them, as well as to their use as dyes for dyeing and printing textile materials, leather and particularly paper.

The novel azo compounds correspond to the formula I

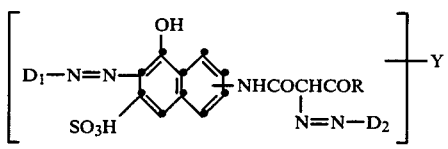

wherein $D_1$ and $D_2$ independently of one another are each the radical of a diazo component, R is unsubstituted or substituted $C_1$–$C_4$-alkyl or unsubstituted or substituted phenyl, and Y is the basic or cationic group, with the proviso that the number of basic and/or cationic Y groups is equal to or greater than the number of $SO_3H$ groups.

The radicals $D_1$ and $D_2$ can be identical or different, and are in particular radicals of the benzene, naphthalene or heterocyclic series (such as benzothiazole, isobenzothiazole and dibenzofuran). These radicals can be substituted, and substitutents can be for example: halogen (for example: fluorine, chlorine or bromine), $C_1$–$C_4$-alkyl (for example: methyl, ethyl, n-propyl, iso-propyl, n-butyl, sec-butyl or tert-butyl), $C_1$–$C_4$-alkoxy (for example: methoxy, ethoxy, n-propoxy, iso-propoxy, n-butoxy, sec-butoxy or tert-butoxy), acetylamino, benzoylamino, phenoxy, $SO_3H$, CN, CO-alkyl-$C_1$–$C_4$ (for example: methylcarbonyl, n-propylcarbonyl, iso-propylcarbonyl, n-butylcarbonyl or iso-butylcarbonyl), heterocyclic rings (for example: benzothiazole), carbonamides, sulfonamides, COOH and arylazo.

In the preferred azo compounds of the formula I, $D_1$ and $D_2$ are identical and are each a phenyl group.

As a $C_1$–$C_4$-alkyl group, R can be straight-chain or branched-chain and is for example: a methyl, ethyl, n-propyl, iso-propyl, n-butyl or sec-butyl group: when these groups are substituted, substituents can be for example: $C_1$–$C_4$-alkoxy (straight-chain or branched-chain) and halogen, particularly chlorine.

If R is a substituted phenyl group, substituents are for example: $C_1$–$C_4$-alkyl, halogen (fluorine, chlorine or bromine) and $C_1$–$C_4$-alkoxy.

In the preferred azo compounds of the formula I, R is unsubstituted $C_1$–$C_4$-alkyl, especially methyl.

As a basic group, Y is in particular the group of the formula

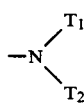

wherein $T_1$ and $T_2$ independently of one another are each: hydrogen, unsubstituted $C_1$–$C_4$-alkyl or substituted $C_1$–$C_4$-alkyl, substituents being for example: OH, $C_1$–$C_4$-alkoxy or the

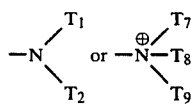

group, in which $T_7$, $T_8$ and $T_9$ have the meanings given in the following.

$T_1$ can however be linked with $T_2$ with the inclusion of the nitrogen atom to form a heterocyclic ring, for example a pyrrolidine, piperidine, morpholine or piperazine ring.

As a cationic group, Y can be for example the following group:

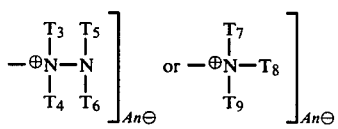

wherein $T_3$ and $T_4$ independently of one another are each $C_1$–$C_4$-alkyl, or cycloalkyl, in particular cyclopentyl and cyclohexyl, unsubstituted or substituted by $C_1$–$C_4$-alkyl;

$T_5$ and $T_6$ independently of one another are each hydrogen, $C_1$–$C_4$-alkyl, or cycloalkyl, in particular cyclopentyl and cyclohexyl, unsubstituted or substituted by $C_1$–$C_4$-alkyl;

$T_7$ is $C_1$–$C_4$-alkyl, unsubstituted or substituted by phenyl, $C_1$–$C_4$-alkylphenyl, OH, halogen or CN, or by the group

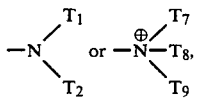

or $T_7$ is cycloalkyl, in particular cyclopentyl and cyclohexyl, unsubstituted or substituted by $C_1$–$C_4$-alkyl, $T_8$ is $C_1$–$C_4$-alkyl, unsubstituted or substituted by phenyl, $C_1$–$C_4$-alkylphenyl, OH, halogen or CN or by the group

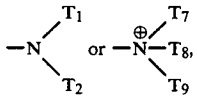

or $T_8$ is cycloalkyl, in particular cyclopentyl or cyclohexyl, unsubstituted or substituted by $C_1$–$C_4$-alkyl, or is a straight-chain or branched-chain $C_1$–$C_4$-alkoxy group, $T_9$ is $C_1$–$C_4$-alkyl, unsubstituted or substituted by phenyl, $C_1$–$C_4$-alkylphenyl, OH, halogen or CN, or by the group

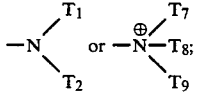

$T_7$ together with $T_8$ and $T_9$ with the inclusion of the nitrogen atom can also form a heterocyclic ring, especially an unsubstituted or substituted pyridinium ring or a triethylenediamine ring of the formula

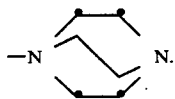

The $C_1$–$C_4$-alkyl groups in association with Y can be straight-chain or branched-chain. They can be for example: the methyl, ethyl, n- and iso-propyl or n-, sec- and tert-butyl groups.

Basic groups Y are for example the following:

—N(CH$_3$)$_2$
—N(C$_2$H$_5$)$_2$
—NH—CH$_3$
—NH$_2$
—NH—C$_3$H$_7$

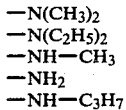

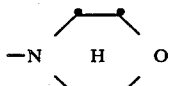

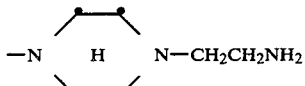

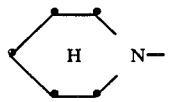

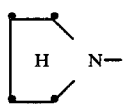

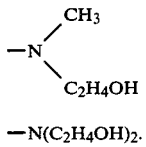

—N(C$_2$H$_4$OH)$_2$.

Cationic groups Y are for example the following:

—⊕N(CH$_3$)$_3$

—⊕N(CH$_3$)$_2$
  |
  NH$_2$

—⊕N(C$_2$H$_5$)$_3$

—⊕N(C$_2$H$_5$)$_2$
  |
  NH$_2$

—⊕N(C$_2$H$_5$)$_2$
  |
  CH$_3$

—⊕N(CH$_3$)$_2$
  |
  C$_2$H$_5$

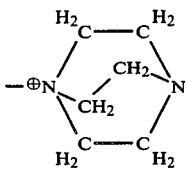

—⊕N(C$_2$H$_4$OH)$_3$

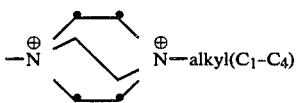

—⊕N(C$_2$H$_4$OH)$_2$
  |
  CH$_3$

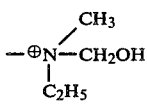

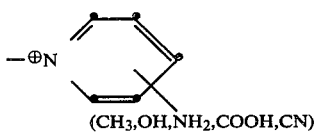

(CH$_3$,OH,NH$_2$,COOH,CN)

—⊕N(CH$_3$)$_2$
  |
  C$_2$H$_4$OH

—⊕N(CH$_3$)$_2$.
  |
  OCH$_3$

In interesting azo compounds of the formula I, Y as a basic group is the —NH$_2$ group and in particular the —N(CH$_3$)$_2$ group or —N(C$_2$H$_5$)$_2$ group; and as cationic group the —⊕N(CH$_3$)$_3$ group or the pyridinium group.

The basic and/or cationic groups Y can be localised in $D_1$, $D_2$ and R; the basic amino groups and cationic ammonium groups can be bound for example to an alkyl group, to a heterocyclic radical or to a phenyl group, whilst the cationic pyridine and hydrazine groups are preferably bound to an alkyl group.

Anions An are both inorganic and organic anions: they are for example the halide ion, such as the chloride, bromide or iodide ion, also the sulfate, methylsulfate, aminosulfate, perchlorate, carbonate, bicarbonate, phosphate, phosphomolybdic, phosphotungstic, phosphotungstomolybdic, benzenesulfonate, naphthalenesulfonate, 4-chlorobenzenesulfonate, oxalate, maleate, formate, acetate, propionate, lactate, succinate, chloroacetate, tartrate, methanesulfonate or benzoate ions, or complex anions, such as those of zinc chloride double salts, as well as boron tetrafluoride.

The anion is in general determined by the production process. Preferably used are the chlorides, hydrogen sulfates, sulfates, methosulfates, phosphates, formiates, lactates or acetates. The anions can be exchanged in a known manner for other anions.

The novel azo compounds of the formula I are produced in a known manner, for example:

(a) by coupling a compound of the formula II

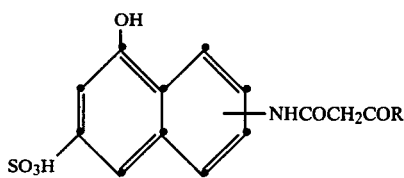

with a diazotised diazo component D₁—NH₂ or D₂—NH₂, the substituent Y being present in D₁, D₂ and/or R; or (b) by coupling a compound of the formula III

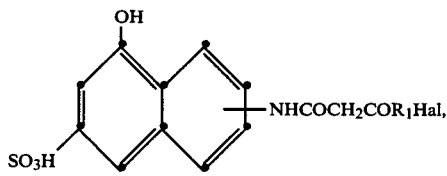

wherein Hal is a halogen atom and R₁ is an unsubstituted or substituted C₁-C₄-alkylene group, with a diazotised diazo component D₁—NH₂ or D₂—NH₂, and subsequently introducing the substituent Y into R₁ by exchange for Hal.

The compounds of the formula II can be obtained for example, in the case where R is the methyl group, from a compound of the formula

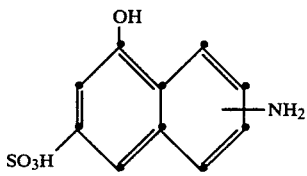

by reaction with diketene in an aqueous medium at about 0°–30° C. When the symbol R in the formula II has the meanings given under the formula I with the exception of methyl, the compounds of the formula II can be obtained also by reaction of a compound of the formula

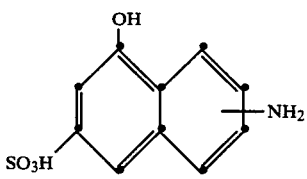

with an acylacetic acid alkyl ester of the formula

C₁-C₄-alkyl—OOC—CH₂—CO—R

The compounds of the formula III can likewise be obtained by known methods, for example by chlorinating a diketene compound, in an organic, water-insoluble solvent, to a compound of the formula

ClCOCH₂COR₁Cl (cp. for example JACS, 62 (1940) p. 1147), and reacting this with a compound of the formula

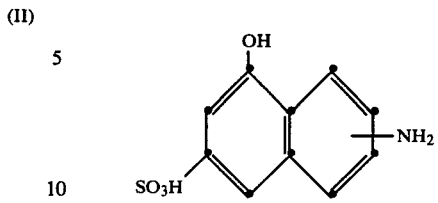

to give a compound of the formula (A)

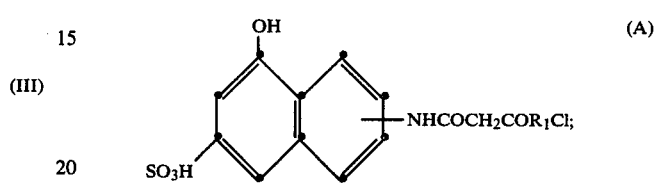

there is subsequently coupled to this compound (A) a diazotised diazo component D₁—NH₂ or D₂—NH₂, and the coupling product Y is introduced into R₁ by exchange for Cl.

In all these cases, diazotisation and coupling are performed in a known manner; thus, for example, coupling is effected preferably in an acid, neutral or slightly alkaline solution, the coupling temperature being in particular between 0° and 50° C.

The azo compounds of the formula I are used both in the form of pulverulent or granular preparations and in the form of concentrated solutions. Pulverulent preparations are formulated in the customary manner with extenders, such as sodium sulfate, sodium phosphate, sodium chloride or sodium acetate, in the presence of antidusting agents; or the azo compounds are sold commercially as spray-dried preparations. Concentrated dye solutions can be of an aqueous or aqueous/organic nature, preferance being given to customary, ecologically favourable additives which are as readily decomposable as possible, such as organic acids, preferably acetic acid, formic acid, lactic acid or citric acid; amides, such as formamide, dimethylformamide or urea; or alcohols, such as glycol, diglycol or diglycol ether, preferably methyl ether or ethyl ether.

The water-soluble azo compounds of the formula I are used particularly as dyes for dyeing and printing natural and synthetic, cationically dyeable substrates, especially paper, semi-cardboard and cardboard, in the pulp and on the surface, as well as textile materials, which consist e.g. advantageously of homo- or copolymers of acrylonitrile, or synthetic polyamides or polyesters which are modified by acid groups. These textile materials are preferably dyed in an aqueous, neutral or acid medium by the exhaust process, optionally under pressure, or by the continuous process. The textile material can be in the most varied forms, for example in the form of fibres, filaments, fabrics, knitted goods, piece goods and finished articles, such as shirts and pullovers.

The novel azo compounds, particularly those of a cationic nature having a boron tetrafluoride anion, can be used also for dyeing polyacrylonitrile materials in the spinning solution.

There are obtained with the dyes according to the invention level dyeings and printings which are distinguished by very good general properties, in particular by a very high degree of exhaustion and good fastness to water.

Furthermore, the novel azo compounds of the formula I can be used for dyeing and printing natural and regenerated cellulose materials, especially cotton and viscose, in which case likewise deeply coloured dyeings are obtained.

The novel azo compounds of the formula I have on these textile materials good substantivity and a high degree of exhaustion, and the dyeings obtained have very good fastness properties, especially very good fastness to wet processing.

In addition, the novel azo compounds can be used for dyeing polyacrylonitrile materials in the spinning solution, and for dyeing polyacrylonitrile wet tow. They can be used also for stamping inks and in jet printing.

A preferred use of the novel azo compounds of the formula I is for the dyeing of paper of all types, particularly bleached, unsized and sized, lignin-free paper, whereby the starting material can be bleached or unbleached pulp, and deciduous or coniferous wood pulp, such as birch and/or pine sulfite and/or sulfate pulp, can be used. These compounds are more especially suitable for dyeing unsized paper (for example serviettes, table cloths and hygienic paper goods) by virtue of the very high affinity of the dyes for this substrate.

The novel azo compounds of the formula I exhaust very well onto these substrates, the waste liquors being left colourless, a factor which is of great ecological advantage, especially in view of the present-day effluent laws.

The dyeings obtained are characterised by good general fastness properties, such as good fastness to light with simultaneously a high degree of clarity and colouring strength and of fastness to wet processing, that is to say, they exhibit no tendency to bleed when dyed paper in the wet state is brought into contact with moist white paper. Furthermore, the dyeings have good fastness to alum, acids and alkalies. The fastness to wetting does not apply only to water but also to milk, fruit juices and sweetened mineral water; on account of their good fastness to alcohol, they are resistant also to alcoholic drinks. This property is desirable for example in particular with regard to serviettes and table cloths, in the case of which it is foreseeable that the dyed paper in the wet condition (for example soaked with water, alcohol, tenside solution, and so forth) will come into contact with other surfaces, such as textiles, paper, and the like, which have to be protected against soiling.

The good affinity for paper and the high rate of exhaustion of the novel dyes according to the present invention is of great advantage for the continuous dyeing of paper.

Finally, the novel azo compounds of the formula I can be used also for dyeing leather (by for example spraying, brushing and dipping), and for the preparation of inks.

The following Examples further illustrate the invention without the scope thereof being limited by them. Except where otherwise stated, 'parts' are parts by weight.

EXAMPLE 1

18 parts of 4-dimethylaminoethoxyaniline are dissolved in 200 parts of water and 50 parts of concentrated hydrochloric acid. The solution is diazotised at 0°–5° C. by the addition of 25 parts by volume of 4N sodium nitrite solution. The excess nitrous acid is bound with sulfamic acid. An aqueous solution containing 16.1 parts of 6-acetoacetamido-1-naphthol-3-sulfonic acid is cooled to 0°–5° C. The ice-cold diazonium solution is added, and the pH value of the coupling mixture is adjusted to 5.5–6 with a sodium hydroxide solution. After completion of coupling, the dye of the formula

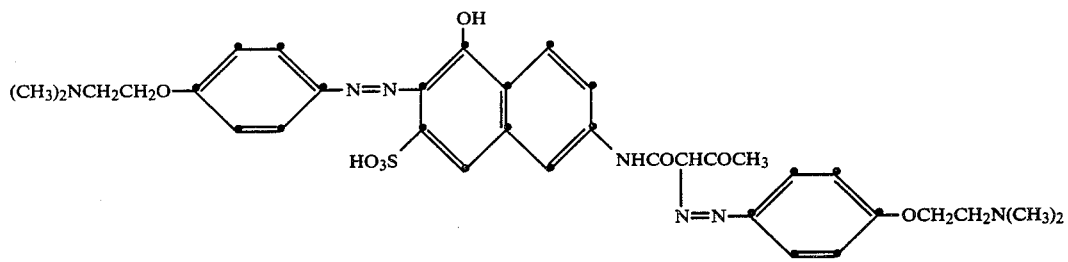

is filtered off and washed with a small amount of water. The dye dissolves in dilute acetic acid to give a scarlet colour and dyes paper pulp in scarlet shades. The waste liquor is colourless.

There are obtained by a procedure analogous to that described above the dyes shown in the following Table.

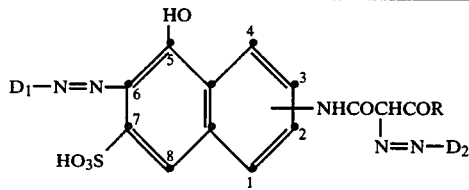

| | $D_1=D_2$ | R | Position of the radical $-NHCOCHCOR$ $\|$ $N=N-D_2$ | Colour on paper |
|---|---|---|---|---|
| 2 | $(CH_3)_2CHNH-$⌬$-$ | $CH_3$ | 2 | orange |
| 3 | $(CH_3)_2NH_6C_3HNOC-$⌬$-$ | $CH_3$ | 2 | orange |
| 4 | $(HOH_4C_2)_2NH_6C_3HNO_2S-$naphthyl$-$ | $CH_3$ | 2 | red |
| 5 | ⌬ with $OC_2H_4N(C_2H_5)_2$ and $Cl$ | $CH_3$ | 2 | red |
| 6 | $(CH_3)_3\overset{\oplus}{N}-$⌬$-$ $(CH_3SO_4^{\ominus})$ | $CH_3$ | 2 | orange |
| 7 | ⌬$-$ with $\overset{\oplus}{N}(CH_3)_3$ $(CH_3SO_4^{\ominus})$ | $CH_3$ | 2 | orange |
| 8 | ⌬$-$ with $NHCOCH_2-\overset{\oplus}{N}$⌬ $(Cl^-)$ | $CH_3$ | 2 | orange |
| 9 | ⌬$\overset{\oplus}{N}-H_4C_2O-$⌬$-$ $(CH_3SO_3^{\ominus})$ | $CH_3$ | 2 | red |
| 10 | piperidino$-N-CH_2-$⌬$-N=N-$⌬$(CH_3)_2$ | $CH_3$ | 2 | brown |
| 11 | morpholino$-N-CH_2-$⌬$-$ | $CH_3$ | 2 | orange |
| 12 | $(C_2H_5)_2NH_4C_2HNOC-$⌬$-$ | $CH_3$ | 2 | orange |
| 13 | $(CH_3)_2\overset{\oplus}{N}CH_2OC-$⌬$-$ $(Cl^{\ominus})$ | $CH_3$ | 2 | orange |

-continued

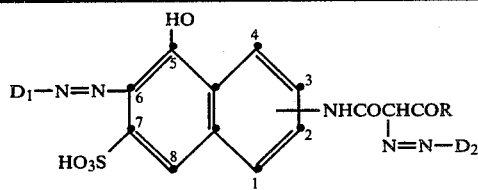

| | $D_1=D_2$ | R | Position of the radical —NHCOCHCOR / N=N—$D_2$ | Colour on paper |
|---|---|---|---|---|
| 14 | (CH₃)₂NC₂H₄O—⌬— | C₄H₉ | 2 | scarlet |
| 15 | (CH₃)₂NC₂H₄O—⌬— | ⌬ | 2 | scarlet |
| 16 | (CH₃)₃N⁺—⌬—N=N—⌬— (Cl⁻) | CH₃ | 2 | brown |
| 17 | ⌬—N=N—⌬(CH₃)— ⁺N(CH₃)₃ (CH₃COO⁻) | CH₃ | 2 | brown |
| 18 | (CH₃)₃N⁺—⌬(OCH₃)(OCH₃)— (HCOO⁻) | CH₃ | 2 | scarlet |
| 19 | naphthyl-CH₂N⁺(CH₃)₃ (CH₃SO₄⁻) | CH₃ | 2 | scarlet |
| 20 | benzothiazole-CH₂N⁺(CH₃)₃ (Cl⁻) | CH₃ | 2 | red |
| 21 | (C₂H₅)₂NCH₂—⌬— | —CH₂N⁺(pyridinium) (Cl⁻) | 2 | orange |
| 22 | (CH₃)₂NH₆C₃HNOC—⌬— | —CH₂N⁺(CH₃)₃ (Cl⁻) | 2 | orange |
| 23 | (CH₃)₂NC₂H₄O—⌬— | CH₃ | 3 | scarlet |
| 24 | (CH₃)₃N⁺—⌬— (CH₃SO₄⁻) | CH₃ | 3 | orange |

-continued

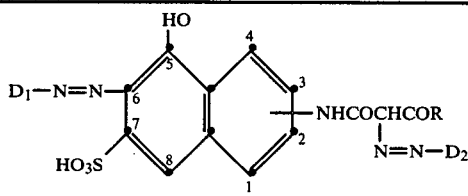

| | $D_1=D_2$ | R | Position of the radical $-NHCOCHCOR$ $\phantom{-NHCOCHC}|$ $\phantom{-NHCOCHCOR}N=N-D_2$ | Colour on paper |
|---|---|---|---|---|
| 25 | $(CH_3)_2NHC_6H_3HNOC-$⟨⟩ | $CH_3$ | 3 | orange |

EXAMPLE 26

When the procedure is carried out in a manner analogous to that described in Example 1 except that there are used, in place of 18 parts of 4-dimethylaminoethoxyaniline, equivalent amounts of 2-dimethylaminoethoxy-5-methylaniline, there is obtained the dye of the formula:

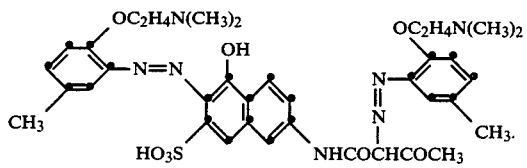

A red dyeing is obtained when this dye is applied to paper.

EXAMPLE 27

When the procedure is carried out in a manner analogous to that described in Example 1 except that there are used, in place of 18 parts of 4-dimethylaminoethoxyaniline, equivalent amounts of 4-pyridinomethylcarbonylaminoaniline, there is obtained the dye of the formula:

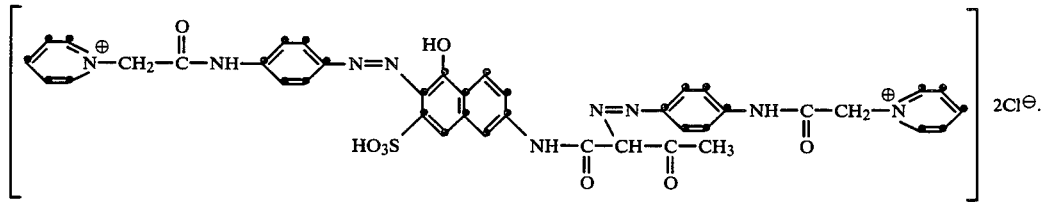

This dye dyes paper in scarlet shades.

EXAMPLE 28

50 parts of chemically bleached sulfite are mixed with 50 parts of bleached RKN 15 (freeness value 22° SR) and 2 parts of the dye according to Example 1 in water (pH 6, water hardness 10° dH, temperature 20° C., ratio of goods to liquor 1:40). After 15 minutes' stirring, paper sheets are produced on a Frank sheet-former.

The paper has been dyed in a scarlet shade, and the waste liquor is completely colourless. The degree of exhaustion attained is practically 100%. The fastness to wet processing and fastness to light are excellent.

EXAMPLE 29

A paper web is produced from bleached beech sulfite (22° SR) on a continuously operating laboratory papermaking machine. Ten seconds before the breastbox, an aqueous solution of the dye according to Example 1 is fed continuously, with intense turbulence, into the fibre suspension (0.5% dyeing, ratio of goods to liquor 1:400, water hardness 10° dH, pH 6, temperature 20° C.).

A deeply coloured scarlet shade of medium intensity has been imparted to the paper web, the waste liquor being left completely colourless.

EXAMPLE 30

10 parts of cotton fabric (bleached mercerised cotton) are dyed, in a laboratory beam dyeing machine, in 200 parts of a liquor (water hardness 10° dH, pH 4, 3 circulations of the dye liquor per minute) containing 0.05 part of the dye according to Example 1. The temperature is raised in 60 minutes from 20° to 100° C., and is then held constant for 15 minutes. The dye liquor is fully exhausted. There is imparted to the cotton fabric a scarlet dyeing which is distinguished by good fastness to light and by very good fastness to wet processing.

When the same procedure is used to dye a textile fabric made from regenerated cellulose (viscose), there is obtained on this material, with the dye of Example 1, a scarlet dyeing having good fastness to light and very good fastness to wet processing.

What is claimed is:
1. An azo compound of the formula

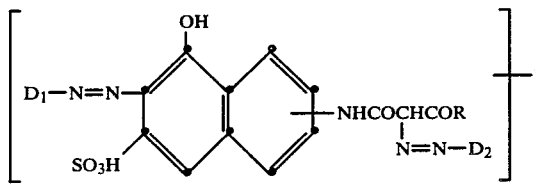

wherein $D_1$ and $D_2$ independently of one another are each the radical of a diazo component, R is $C_1$-$C_4$-alkyl or $C_1$-$C_4$ alkyl substituted by $C_1$-$C_4$-alkoxy or halogen or is phenyl or phenyl substituted by $C_1$-$C_4$-alkyl, halogen or $C_1$-$C_4$ alkoxy, and Y is a basic or cationic group, with the proviso that the number of basic or cationic Y groups is equal to or greater than the number of $SO_3H$ groups.

2. An azo compound of claim 1, wherein $D_1$ and $D_2$ independently of one another are each a benzene, naphthalene or heterocyclic radical.

3. An azo compound of claim 1, wherein R is unsubstituted $C_1$-$C_4$-alkyl.

4. An azo compound of claim 1, wherein R is methyl.

5. An azo compound of claim 1 wherein Y is a basic group of the formula

wherein $T_1$ and $T_2$ independently of one another are each hydrogen, $C_1$-$C_4$-alkyl or $C_1$-$C_4$-alkyl substituted by hydroxyl, $C_1$-$C_4$-alkoxy, or $-N^{\oplus}T_7T_8T_9$, or $T_1+T_2$ with the inclusion of the nitrogen atom form a heterocyclic pyrrolidine, piperidine, morpholine or piperazine ring, and wherein $T_7$, $T_8$ and $T_9$ independently of each other are each $C_1$-$C_4$-alkyl, or $C_1$-$C_4$-alkyl substituted by phenyl, $C_1$-$C_4$-alkylphenyl, hydroxyl, halogen, CN, $-NT_1T_2$ or $T_7$, $T_8$, and $T_9$ complete a nitrogen-containing heterocyclic ring selected from the group consisting of pyridinium, pyridinium substituted by methyl, hydroxyl, amino, COOH and CN, 1,4-diazobicyclo[2,2,0]octyl and 1,4-diazobicyclo[2,2,0]octyl substituted by $C_1$-$C_4$-alkyl in the 4-position, or $T_7$ and $T_8$ are $C_5$ or $C_6$-cycloalkyl.

6. An azo compound of claim 1, wherein Y is a cationic group of the formula

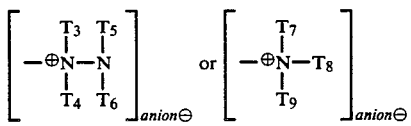

wherein $T_3$ and $T_4$ independently of one another are each $C_1$-$C_4$-alkyl or cycloalkyl, $T_5$ and $T_6$ independently of one another are each hydrogen, $C_1$-$C_4$-alkyl or cycloalkyl, $T_7$, $T_8$, and $T_9$ independently of each other are each $C_1$-$C_4$-alkyl, or $C_1$-$C_4$-alkyl substituted by phenyl, $C_1$-$C_4$-alkylphenyl, hydroxyl, halogen, CN, $-NT_1T_2$ or $-N^{\oplus}T_7T_8T_9$, or $T_7$, $T_8$, and $T_9$ complete a nitrogen-containing heterocyclic ring selected from the group consisting of pyridinium, pyridinium substituted by methyl, hydroxyl, amino, COOH and CN, 1,4-diazobicyclo[2,2,0]octyl and 1,4-diazobicyclo[2,2,0]octyl substituted by $C_1$-$C_4$-alkyl in the 4-position, or $T_7$ and $T_8$ are $C_5$ or $C_6$ cycloalkyl.

* * * * *